United States Patent [19]

Noda

[11] 3,769,685
[45] Nov. 6, 1973

[54] METHOD OF CLAMPING STEEL CORE ALUMINUM STRANDED WIRES

[75] Inventor: Hiroshi Noda, Shinagawa-ku, Tokyo, Japan

[73] Assignee: Sanwa Tetsuki Kougiyou Kabushiki Kaisha, Tokyo, Japan

[22] Filed: Oct. 5, 1971

[21] Appl. No.: 186,719

[52] U.S. Cl. ............. 29/459, 29/517, 29/526, 24/125 N, 287/79, 287/109, 24/115 A
[51] Int. Cl. .................. B23p 3/00, B23p 25/00
[58] Field of Search ............. 29/516, 517, 458, 29/459, 526; 24/115 A, 123 W, 125 NX, 135 N; 287/79 X, 78, 76, 109 X

[56] References Cited
UNITED STATES PATENTS

| | | | |
|---|---|---|---|
| 1,036,143 | 8/1912 | Phillips | 24/135 N UX |
| 1,643,110 | 9/1927 | Briggs | 24/123 W |
| 1,949,601 | 3/1934 | Burd | 24/123 W |
| 1,995,420 | 3/1935 | Fischer | 287/109 X |
| 2,174,010 | 9/1939 | Patterson | 29/517 UX |
| 2,901,822 | 9/1959 | Hayden | 29/517 |
| 3,033,600 | 5/1962 | Drysdale | 29/517 X |

Primary Examiner—Charlie T. Moon
Attorney—Holman & Stern

[57] ABSTRACT

A method of clamping steel core aluminum stranded wires by inserting a steel core wire into a steel core wire inserting hole in a steel sleeve provided with a plurality of axial slits on the outer wall of the steel core wire inserting hole and having a through screw hole directed to the axis near the base of the slits, screwing a push screw to be screwed into the above mentioned screw hole to press the steel core wire with the tip so that the head of the screw may be hidden in the screw hole, inserting this steel sleeve into a cylindrical part of an aluminum sleeve into which it can be inserted with a slight clearance and compressing the aluminum sleeve on the outer periphery.

3 Claims, 4 Drawing Figures

PATENTED NOV 6 1973  3,769,685
FIG.1
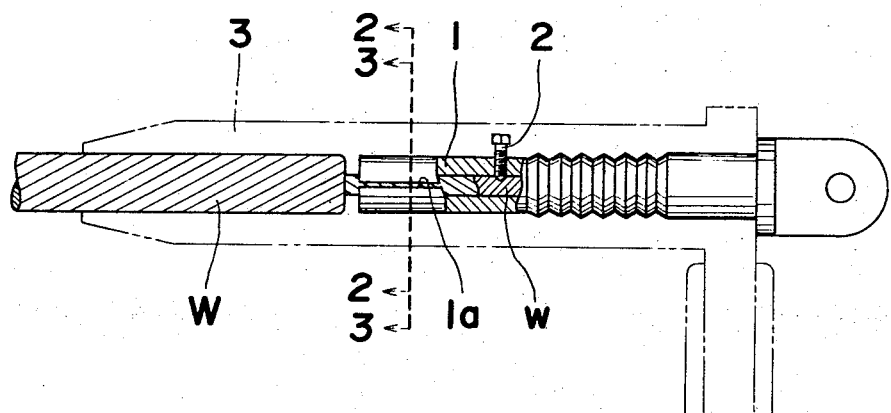
FIG.2  FIG.3
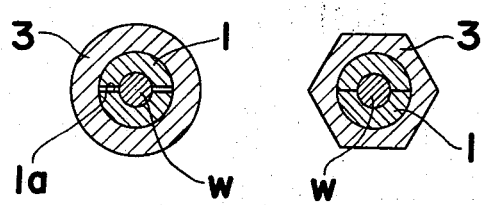
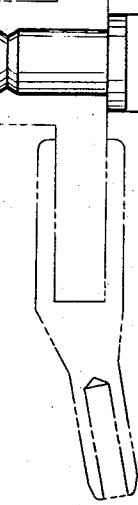
FIG.4
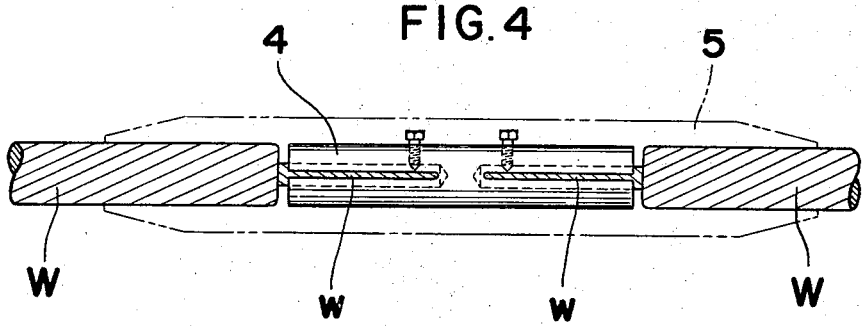
INVENTOR.
Hiroshi Noda
BY
Holman & Stern

METHOD OF CLAMPING STEEL CORE ALUMINUM STRANDED WIRES

BACKGROUND OF THE INVENTION

There is known such method of clamping steel core aluminum stranded wires as with an anchor clamp or a straight sleeve. The present invention relates to improvements in such method.

BRIEF DESCRIPTION OF THE DRAWINGS

FIG. (1) is a side view in partial section of this method as used in an anchor clamp.

FIGS. (2) and (3) are cross-sectional end views on line 1—1 2—2 in FIG. (1) respectively before and after the compression.

FIG. (4) is side view of this method as used in a straight sleeve.

DESCRIPTION OF PREFERRED EMBODIMENTS

First of all, the case of an anchor clamp shall be explained with reference to the drawings. According to the present invention, in a steel sleeve (1) having a hole for inserting a steel core wire (w) of a steel core aluminum stranded wire (W), a plurality of axial slits (1a) are made on the outer wall of the inserting hole, a through screw hole radial to the axis of the hall is made near the base of the slits and a push screw (2) is screwed into the through screw hole. The steel core aluminum stranded wire to be clamped has the aluminum core part on the outer periphery at the end part scraped off and has the steel core wire (w) inserted into the inserting hole of this steel sleeve to the bottom thereof. This inserting hole is coated in advance with a compound mixed with abrasive particles, such as carborundum, so that the frictional force of the inserted steel core wire may be increased. Then the push screw (2) is strongly screwed so as to bite at the tip into the steel core wire. For this purpose, as required, there may be used a push screw which has its head exposed out of the steel sleeve even after it is screwed in, as shown in the drawing and is then strongly screwed to have the head twisted off. The push screw is so made as to be hidden in the screw hole after it is completely screwed in. Then this steel sleeve is inserted into a cylindrical hole of an aluminum sleeve (3). This hole is so designed as to leave only a slight clearance between it and the steel sleeve. After the insertion, the aluminum sleeve is compressed having the outer periphery from the end on the push screw to the other end so that the three members, of the aluminum sleeve, the steel sleeve and the steel core aluminum stranded wire may be integral. Since the push screw (2) bites into the tip of the steel core wire, there is no fear that when the aluminum sleeve is compressed the steel core wire will come out. The steel sleeve, provided because of a flexibility with the slits, will strongly grip the steel core wire due to this compression. That is to say, with only one compression, the above mentioned three members can be made strongly integral.

Conventional steel sleeves are not provided with the above mentioned slits (1a). Such steel sleeves are compressed to grip the steel core wire after it is inserted into the sleeve. By this compression, the steel sleeve will be bent and a bend correcting step will be required. During such a step, the reduction of the gripping force for the steel sleeve is unavoidable. Even if such bend is corrected, in order that the steel sleeve may be reasonably inserted into the aluminum sleeve, it will be necessary to provide a proper clearance between them. It is considered necessary to insert a collar for filling the clearance or to wind a wire on the outer periphery of the steel sleeve before the aluminum sleeve is compressed.

On the other hand, in the present invention, no steel sleeve compressing step is necessary. The steel sleeve has no space for generating bends. When the steel sleeve is inserted into the aluminum sleeve and the aluminum sleeve is compressed, the three members can be made strongly integral as mentioned above. It is a feature of the present invention that the problem of compressing the steel sleeve and the disadvantage accompanying it are eliminated as in the above.

In the above, an anchor clamp has been described as an example. However, the present invention can be utilized also in a straight sleeve (5) as in FIG. (4) in exactly the same manner. It is only different that, in a strain clamp, the electric wire (W) is inserted only in one direction, whereas, in a straight sleeve, the steel core wires (w) are inserted as opposed to each other on both sides of the steel sleeve (4).

What is claimed is:

1. A method of clamping steel core aluminum stranded wires by inserting a steel core wire into a steel core wire inserting hole in a steel sleeve provided with a plurality of axial slits on the outer wall of the steel sleeve defining the core wire inserting hole and having a through screw hole directed toward the axis near the base of the slits; screwing a push screw into said screw hole to press the steel core wire at its tip; then inserting said steel sleeve into a cylindrical hole in an aluminum sleeve into which it can be inserted with a slight clearance; and compressing the aluminum sleeve at the outer periphery.

2. The method as claimed in claim 1 including the further steps of screwing said push screw in as far as it will go and if the head is protruding from the contour of the steel sleeve, then removing at least that protruding portion.

3. The method as claimed in claim 1 including the further step of coating the steel core wire inserting hole with abrasive particles before inserting the steel core wire into said hole.

* * * * *